US012634385B2

(12) United States Patent
Condoluci et al.

(10) Patent No.: US 12,634,385 B2
(45) Date of Patent: May 19, 2026

(54) CONFIGURING A USER PLANE (UP) PROTOCOL LAYER

(71) Applicant: Telefonaktiebolaget LM Ericsson (publ), Stockholm (SE)

(72) Inventors: Massimo Condoluci, Solna (SE); Paul Schliwa-Bertling, Ljungsbro (SE); Dung Pham Van, Upplands Väsby (SE); Bikramjit Singh, Raasepori (FI); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 18/572,877

(22) PCT Filed: Jun. 21, 2021

(86) PCT No.: PCT/EP2021/066889
§ 371 (c)(1),
(2) Date: Dec. 21, 2023

(87) PCT Pub. No.: WO2022/268292
PCT Pub. Date: Dec. 29, 2022

(65) Prior Publication Data
US 2024/0314229 A1     Sep. 19, 2024

(51) Int. Cl.
*H04L 69/321* (2022.01)
*H04L 69/16* (2022.01)
*H04L 69/168* (2022.01)

(52) U.S. Cl.
CPC .......... *H04L 69/321* (2013.01); *H04L 69/161* (2013.01); *H04L 69/168* (2013.01)

(58) Field of Classification Search
CPC .... H04L 69/321; H04L 69/161; H04L 69/168
See application file for complete search history.

(56) References Cited

U.S. PATENT DOCUMENTS 10,505,783 B2 * 12/2019 Chun ................... H04W 28/065
2009/0149189 A1 * 6/2009 Sammour ............. H04W 80/02
                                                                    455/450
(Continued)

FOREIGN PATENT DOCUMENTS

CN          110071935 A      7/2019

OTHER PUBLICATIONS

3GPP; 3GPP TS 38.300 V16.4.0 (Dec. 2020); Technical Specification Group Radio Access Network; NR; NR and NG-RAN Overall Description; Stage 2 (Release 16); 149 pages.
(Continued)

*Primary Examiner* — Mohamed A. Wasel
(74) *Attorney, Agent, or Firm* — Sage Patent Group

(57) ABSTRACT

A method including a protocol stack including a plurality of layers, the plurality of layers including a first layer and a second layer. The first layer generating a first protocol data unit (PDU) associated with a first data flow. The second layer obtaining the first PDU and information about the first PDU. Further, the method includes the second layer either i) determining, based on the information about the first PDU, a sublayer configuration to be applied to at least one or more PDUs associated with the first data flow or ii) providing to another layer the information about the first PDU so that the another layer can determine, based on the information, the sublayer configuration to be applied to the one or more PDUs associated with the first data flow.

18 Claims, 8 Drawing Sheets

(56) References Cited

U.S. PATENT DOCUMENTS

| | | | | |
|---|---|---|---|---|
| 2009/0168710 | A1* | 7/2009 | Thakare | H04W 80/02 |
| | | | | 370/329 |
| 2016/0241680 | A1* | 8/2016 | Cho | H04L 69/18 |
| 2019/0215693 | A1* | 7/2019 | Lee | H04L 63/205 |
| 2019/0268797 | A1* | 8/2019 | Pang | H04L 47/125 |
| 2019/0364492 | A1* | 11/2019 | Azizi | H04W 52/0264 |
| 2021/0092612 | A1* | 3/2021 | Yang | H04W 12/106 |
| 2021/0258819 | A1* | 8/2021 | Wu | H04W 4/80 |
| 2023/0262514 | A1* | 8/2023 | Van Der Velde | |
| | | | | H04W 28/0268 |
| | | | | 370/235 |

OTHER PUBLICATIONS

3GPP; 3GPP TS 23.501 V16.0.0 (Mar. 2019); Technical Specification Group Services and System Aspects; System Architecture for the 5G System; Stage 2 (Release 16); 318 pages.
International Search Report and Written Opinion mailed Mar. 3, 2022 for International Application No. PCT/EP2021/066889, 13 pages.

* cited by examiner

502
Communication device

Sublayer Functionality Configuration
(<Functionality A, Filter A>;  <Functionality B, Filter B>, ...)

504
Network node

600

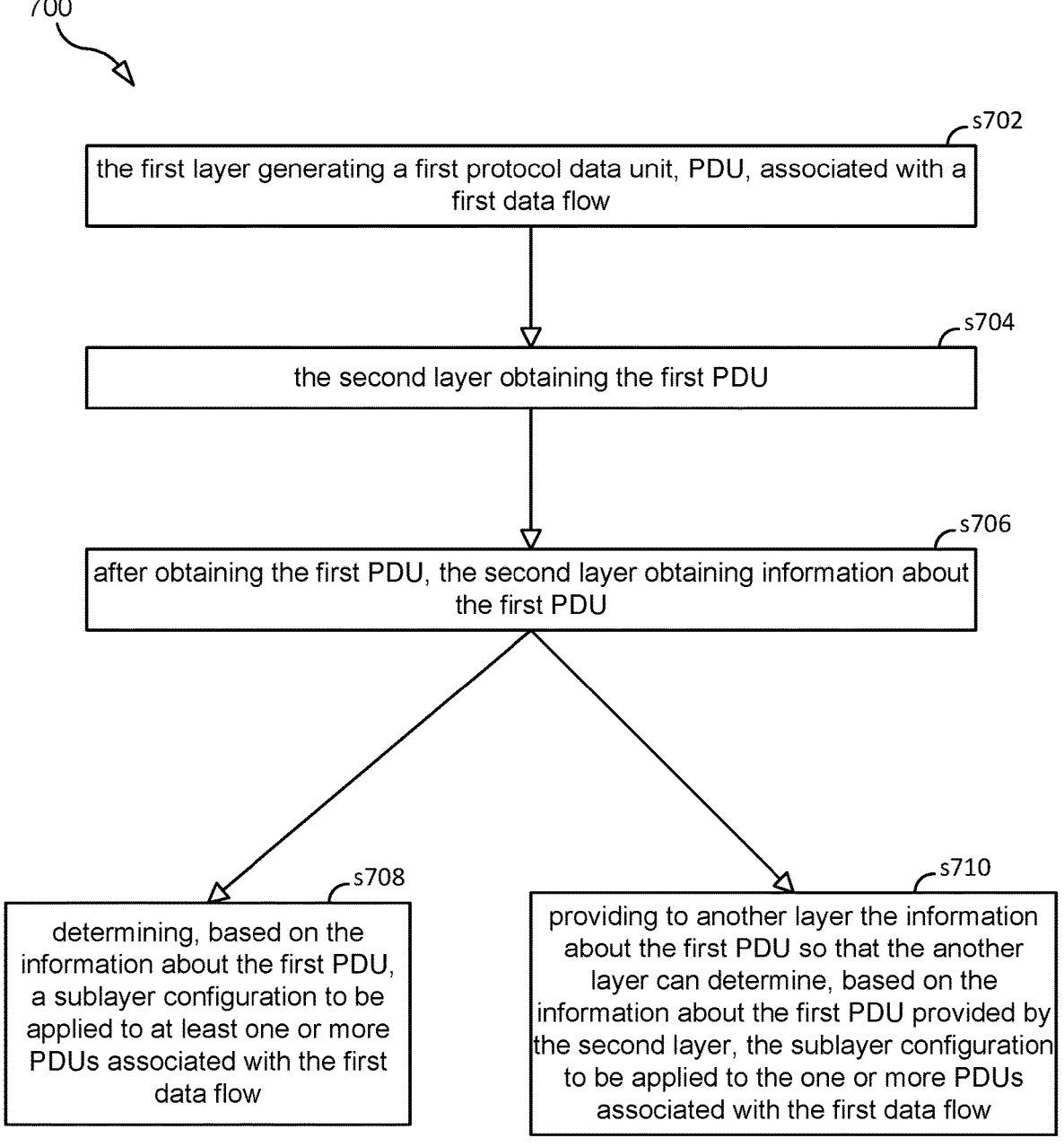

700 s702 the first layer generating a first protocol data unit, PDU, associated with a first data flow s704 the second layer obtaining the first PDU s706 after obtaining the first PDU, the second layer obtaining information about the first PDU s708 determining, based on the information about the first PDU, a sublayer configuration to be applied to at least one or more PDUs associated with the first data flow s710 providing to another layer the information about the first PDU so that the another layer can determine, based on the information about the first PDU provided by the second layer, the sublayer configuration to be applied to the one or more PDUs associated with the first data flow

FIG. 7

CONFIGURING A USER PLANE (UP) PROTOCOL LAYER

CROSS-REFERENCE TO RELATED APPLICATIONS

This application is a 35 U.S.C. § 371 national stage application for International Application No. PCT/EP2021/066889, entitled "CONFIGURING A USER PLANE (UP) PROTOCOL LAYER", filed on Jun. 21, 2021, assigned to the assignee hereof, and expressly incorporated herein by reference.

TECHNICAL FIELD

Disclosed are embodiments related to configuring one or more user plane (UP) protocol layers.

BACKGROUND

1. 3GPP 5G Reference Architecture

FIG. 1 illustrates the 3rd Generation Partnership Project (3GPP) fifth generation (5G) reference architecture. As illustrated in FIG. 1, several 5G Core Network (CN) functions are defined, including: the Application Function (AF), the Network Exposure Function (NEF), the Binding Support Function (BSF), the Unified Data Repository (UDR), the Policy Control Function (PCF), the Session Management Function (SMF), and the User Plane Function (UPF). As further shown in FIG. 1, the 5G CN enables a user equipment (UE) 102 to access a packet data network (PDN) (e.g., the Internet) via a radio access network (RAN) and the UPF.

The Network Exposure Function (NEF) supports different functionality and specifically in the context of this disclosure, the NEF supports different Exposure APIs.

The Binding Support Function (BSF) stores internally information about the corresponding selected PCF for the user session.

The Unified Data Repository (UDR) stores data grouped into distinct collections of subscription-related information: Subscription Data; Policy Data; Structured Data for Exposure; and Application Data.

The Policy Control Function (PCF) supports a unified policy framework to govern the network behavior. Specifically, the PCF provides PCC (Policy and Charging Control) rules to the PCEF (Policy and Charging Enforcement Function, e.g., the SMF/UPF that enforces policy and charging decisions according to provisioned PCC rules).

The Session Management function (SMF) supports different functionalities, e.g. SMF receives PCC rules from the PCF and configures the UPF accordingly.

The User Plane function (UPF) supports handling of user plane traffic based on the rules received from the SMF, e.g. packet inspection and different enforcement actions such as QoS handling.

2. The OSI Seven Layer Model

The Open Systems Interconnection (OSI) model is a conceptual model 200 (see FIG. 2) that describes the communication functions of a communication device 202 (e.g., a user equipment (UE) or a network node (e.g., UPF)). As shown in FIG. 2, the OSI model partitions the flow of data in a communication device into seven protocol layers, from the physical layer (bottom layer), which is responsible for transmitting bits across a communications medium (e.g., air or wire), to the application layer (the highest layer). Each layer in-between (e.g., the network layer and the transport layer) provides functionality to its above layer and is served by the layer below it. The Internet Protocol (IP) is an example of a network layer protocol, whereas the Transmission Control Protocol (TCP) and the User Datagram Protocol (UDP) are examples of a transport layer protocol. Another example of a transport layer protocol is the QUIC protocol recently defined by the Internet Engineering Task Force (IETF) in Request for Comments (RFC) 9000.

Each layer of the OSI model can itself comprise multiple protocol layers. For example, FIG. 3 illustrates an implementation of the data link layer that is used in 3GPP 5G radio access networks (a.k.a., "New Radio" (NR)). As shown in FIG. 3, the NR data link layer comprises the following protocol layers: 1) Service Data Adaptations Protocol (SDAP) layer; 2) Packet Data Convergence Protocol (PDCP) layer; 3) Radio Link Control (RLC) layer; and 4) Medium Access Control (MAC) layer. As shown in FIG. 3, each layer of the data link layer may communicate with and receive configuration data from a control plane layer (e.g., the Radio Resource Control (RRC) layer in this example).

3. Protocol Layer Configuration

The possibility to configure a protocol layer to support specific features available at end-point sides is an important aspect for mobile networks in order to enhance user experience. Examples include support of network information (e.g., rate recommendation, congestion notification) to rate-adaptive applications, where application/transport (TCP, QUIC, etc.)/congestion control (RTC, SCREAM)/network (IP) protocols can use e.g. congestion information or bitrate recommendations generated by the network to adjust transmission bitrate.

This is pushed by the fact that certain upper-layers of the protocol stack (e.g., from layer 3 (L3) (e.g., IP) to layer 7 (L7) (e.g., HTTP)) have introduced new features that services at end-user side can leverage. One example is the usage of dedicated fields in the IP header of user-plane packets (e.g., Explicit Congestion Notification (ECN)) introduced to indicate by user plane nodes (e.g., gNBs, UPFs, routers) whether a data flow is affected by congestion, so that, for example, a higher layer (e.g., applications, transport, session) can use such information to perform tasks such as rate adaptation or flow congestion control.

The IETF has recently focused on the interaction between the application and transport layers. The IETF identified that application programmers face a difficulty when they use protocols other than TCP or UDP, and the IETF Transport Services (TAPS) working group is working on describing an (abstract) interface for applications to make use of transport services. This is expected to facilitate the usage by applications of the features offered by transport protocols.

Moving towards sixth-generation (6G) mobile networks, trends are (i) to leverage more on capabilities of upper-layers (pushing this all the way to using upper-layer features like multi-path TCP (MP-TCP) and multi-path QUIC (MP-QUIC) into mobile networks); (ii) to move towards more recent and efficient protocols (e.g., applications replacing TCP with QUIC); and (iii) quick large scale introductions of new features (e.g., Facebook switching all applications to use QUIC instead of TCP with a software update). QUIC is advantageous in that it provides, among other things, built-in authentication and encryption, multi-path capabilities, in-order delivery, etc.

SUMMARY

Certain challenges presently exist. For example, presently there is a lack of specific functionality in mobile networks for enabling optimization of protocol layer configurations considering the configuration of a certain data flow. Optimization of protocol layer configurations include disabling and/or enabling certain functionalities (e.g., encryption, error correction, in-order delivery, etc.). Currently, mobile networks have service-dependent functionality optimization in the core network. For example, a video data flow can be identified in the core network user plane nodes (e.g., a UPF) and then video packets can be provided with specific functionalities, e.g., video optimization processing. Accordingly, there is a need for a flexible and upper-layer friendly way to map configurations of upper-layers to configurations of lower-layers within the stack.

Accordingly, in one aspect there is provided a method in a communication device comprising a protocol stack comprising a plurality of layers, the plurality of layers comprising a first layer and a second layer. In one embodiment the method includes the first layer generating a first protocol data unit, PDU, associated with a first data flow. The method also includes the second layer obtaining the first PDU. The method also includes after obtaining the first PDU, the second layer obtaining information about the first PDU. And the method also includes after obtaining the information about the first PDU, the second layer either i) determining, based on the information about the first PDU, a sublayer configuration to be applied to at least one or more PDUs associated with the first data flow or ii) providing to another layer (e.g., RRC, NAS) the information about the first PDU so that the another layer can determine, based on the information about the first PDU provided by the second layer, the sublayer configuration to be applied to the one or more PDUs associated with the first data flow.

In another aspect there is provided a computer program comprising instructions which when executed by processing circuitry of a communication device causes the communication device to perform any of the methods disclosed herein. In one embodiment, there is provided a carrier containing the computer program wherein the carrier is one of an electronic signal, an optical signal, a radio signal, and a computer readable storage medium. In another aspect there is provided a communication device that is configured to perform the methods disclosed herein. The communication device may include memory and processing circuitry coupled to the memory.

An advantage of the embodiments disclosed herein is that they enable optimization of protocol configurations for certain traffic (e.g., a certain data flow) based on upper layer features of the traffic. The embodiments overcome the limits coming from using techniques such as service data flow (SDF) filtering and 5-tuple filtering mapped to a 5QI. The embodiments are particularly relevant when considering cases of mobile networks with high degrees of configurations, especially of user plane functionalities, to better support features of upper-layers or to optimize packet treatment within the network according to such features.

The advantages of the embodiment can further be summarized as follows. The embodiments enable a communication device to take into consideration specific features or settings of upper-layers for a certain traffic, and to accordingly set up user plane functionalities (vs considering only mapping to a certain semi-static QoS treatment). The embodiments perform this mapping in a flexible way at the network protocol stack and separately from service filtering, limiting the bottleneck of relying on pre-configured and complex filtering rules. Thus, there is an advantage in supporting an increased flexibility of protocol stack functionalities configuration. Furthermore, the embodiments enable a communication device to rely on upper-layer features to optimize its behavior (and to offer better handling of services). For example, it is expected that usage of QUIC will increase, and if the communication device is able to understand in a flexible way that, for example, QUIC built-in encryption is used and that QUIC will perform re-ordering of packets, the communication device can take advantages of such upper-layer features configuring a user plane handling where, e.g. retransmission and whole packet encryption is avoided. Thus providing benefits in terms of less network load (avoid retransmissions) and reduced latency (less processing time as only packet headers are to be encrypted). The embodiments allow the communication devices to understand which specific user plane configuration or functionalities should be used where such functionalities could be selected with the aim of, e.g., avoiding duplications at network sublayers of functionalities already provided by upper-layers.

BRIEF DESCRIPTION OF THE DRAWINGS

The accompanying drawings, which are incorporated herein and form part of the specification, illustrate various embodiments.

FIG. 7 is a flowchart illustrating a process according to some embodiments.

DETAILED DESCRIPTION

Figure 1:
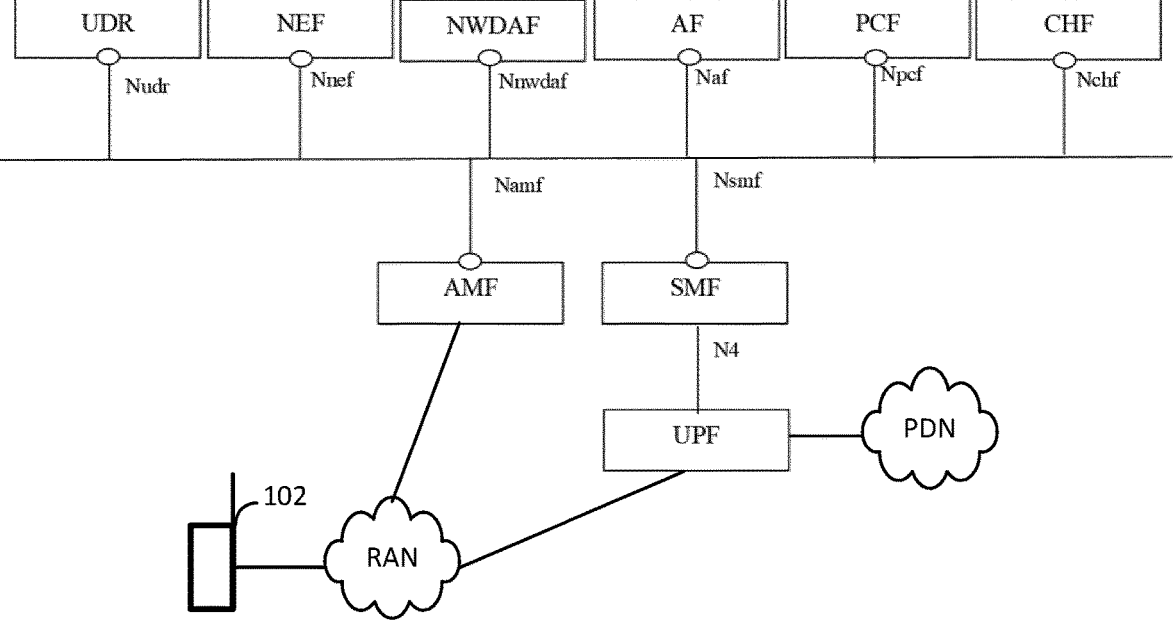
FIG. 1 illustrates the 3GPP 5G reference architecture.
Figure 2:
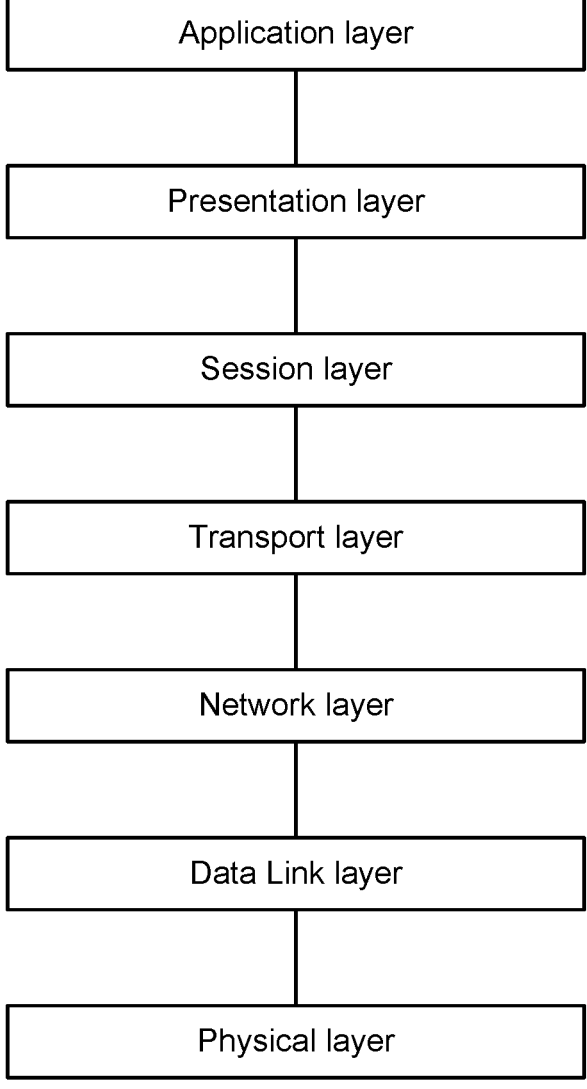
FIG. 2 illustrates the OSI reference model.
Figure 3:
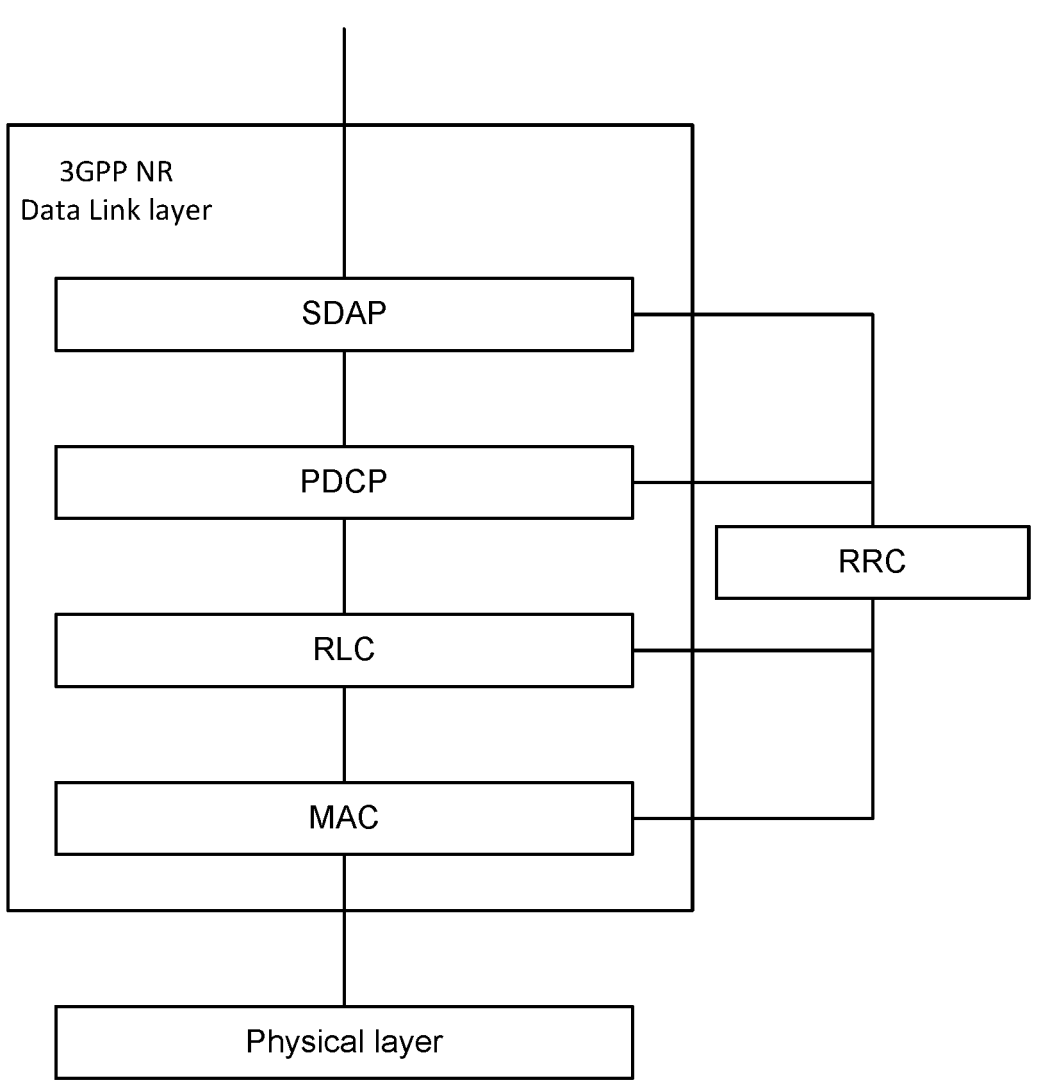
FIG. 3 illustrates a data link layer according to some embodiments.

In this disclosure the term "upper-layer" refers to a protocol layer that exists above the data link layer (layer 3 of the OSI model). Upper-layers can be at a UE, or can be at a user plane entity of the mobile network (e.g., at a UPF in a 5G core network, or at an access network node considering possible new network architectures). Examples of "upper layers" include IP, TCP, QUIC, application layers, etc. The term "sublayer" refers to any protocol layer beneath an upper-layer.

Current mobile network provide service identification and differentiation for Quality-of-Service (QOS) mapping (i.e., identifying which QoS applies to a certain service according to its requirements using, for example, SDF filters/QoS or packet detection rules/5-tuple and traffic differentiation based on 5QI). Accordingly, the current service identification/differentiation mechanisms aim to identify whether a flow of data packets belongs to service A or to service B, and consequently whether 5Q1 X or 5Q1 Y should be associated with the data flow so the network can understand which bearer, QoS Flow, scheduling, etc. to use for the data flow. This is motivated by the fact that, for the radio part, the aim of the network is to understand how radio resources can be used in the best way (which traffic should be prioritized)

considering the different traffic in a certain cell. But, in addition to scheduling and traffic prioritization, a certain service could also benefit from optimization of the user plane (e.g., radio protocol stack layer functionalities) depending on which features are used at layer three (L3) and above. This implies that service identification/differentiation should not only be limited to understand which 5QI (or, in general, QoS treatment) should be associated to a certain data flow, but also whether the data flow should be associated with user plane functionality A, B, or C. And potentially, an application could also want to switch on-off functionalities (e.g., an AI-based application able to adapt its configuration to optimize perceived QoE), with the implication that user plane functionality marking might need to be dynamic, potentially per-packet, instead of being per-service.

Current mechanisms do not offer a viable solution specifically tailored to understand which configuration of the radio protocol stack should be used for a certain services, unless there is a pre-defined mapping (e.g., the network is already aware that a certain service mapped to a certain QoS rule/5QI has a certain configuration of upper-layers to be mapped to a certain protocol stack configuration). Preconfigured mappings might limit the flexibility as well as granularity of such configurations. This is particularly relevant since 6G networks might offer more degrees of user plane configuration compared to 5G networks.

For instance, for a certain service realized using QUIC, a communication device might decide to encrypt only packet headers while avoiding encrypting the whole user plane packet (relying on built-in QUIC encryption). If, however, the same service is realized using another protocol without built-in encryption, the network might then encrypt the whole packet. In addition, it is worth noting that upper-layers are becoming more and more capable, and it should then be expected that new features will be introduced to upper-layers in quicker way and that applications will start leveraging such features. This further pushes for mechanisms in mobile network to dynamically support user plane functionality configurations depending on upper-later features.

Accordingly, there is a need for a flexible and upper-layer friendly (and future-proof) way to map configurations of upper-layers to configurations of lower-layers within the stack, with the aim to extend the current service identification/differentiation performed by mobile networks including also aspects of flexible network sublayers configuration. This is especially relevant when moving towards 6G networks, where it is expected an increase in network functionalities tailored according to upper-layers, so not having a flexible way of performing traffic identification/differentiation might represent a bottleneck for the network optimization based on upper-layer features.

This discloses proposes embodiments that introduce a capability in a mobile network to identify which specific configurations should be applied to radio network protocol stack for a certain traffic, where such configurations are set according to the specific configuration (e.g., features) of the upper-layers used by the traffic. In one embodiment, the protocol stack of a mobile network is extended as follows: a certain protocol layer obtains protocol data unit (PDU) (a.k.a., "data packet") produced by a layer above the certain protocol layer and based on the configuration of the upper-layer(s), selects a specific configuration to use for the data flow. Accordingly, the configuration of communication channel (radio bearer, flow, etc.) is influenced by the configuration of the service, reflected from the upper-layer features the traffic uses, with user plane stack directly involved in such decisions (whereas in legacy network the communication channel configuration is pre-configured and each change in the way a service is implanted dictates a communication channel re-configuration). In certain embodiments, the protocol layer(s) in charge of performing the mapping interacts with a control plane layer (e.g., RRC entity) to trigger the configuration of specific sublayer functionalities based on upper-layers features, while in other embodiments the protocol layer(s) in charge of performing the mapping directly interact with the relevant sublayers to indicate which specific configurations to apply to the data flow even on a per data packet basis.

In this disclosure, a protocol stack used in a mobile network (e.g., a 5G network, etc.) is extended with the capability of network sublayer functionality differentiation which is performed based on the features of upper-layers for a certain data flow. A protocol layer might also add specific indicators (e.g., flags) to data packets belonging to the data flow for the purpose of identifying specific configurations to be used and/or for exchanging information among sublayers and/or with upper-layers related to selected configurations. While this disclosure targets mainly user plane data traffic, the embodiments can be applied to sublayer functionalities of both user and control plane traffic.

Examples of upper-layer configurations include, but are not limited to: i) the specific protocols that are used (e.g., IP, TCP, QUIC), potentially also including information about used versions; ii) the specific functionalities that are used on some specific protocol, e.g., whether congestion notification is required and this might be understood by checking the ECN field of the IP header; iii) the specific functionalities are required by the service, e.g., some new signaling could be introduced to allow a data flow to explicitly indicate to the network that e.g., the traffic should be/should be not encrypted, that the packet should, if received out of order, be reordered by the network layer (which may include buffering and retransmissions) or that the packets should be delivered to higher layer in the order it was received (relying on upper layer to handle out of order packets), etc; and iv) high-level indications such as semantic-based information provided by the service, e.g., a service could communicate with the network using messages such as "I need packets delivered as soon as possible" or "I manage security" rather than using pre-defined configurations of particular protocols (e.g., specific fields of header of a certain protocol). Indications of an upper-layer configuration may be contained in an upper-layer PDU (e.g., a bit string in a hearer of an upper-layer PDU may identify a protocol).

Depending on an upper-layer configuration, a configuration can be chosen for a lower layer (a.k.a., "sublayer"). These configurations may also depend on available network capabilities in terms of possible network sublayer configurations and could be either standardized functionalities (e.g., by 3GPP) or vendor specific or set by network operators. Examples of network sublayer configurations that could be configured based on upper-layer configurations include, but are not limited to the following: i) specific security configurations of packets; ii) specific settings of network sublayers; and iii) specific operational capability of network sublayers.
I) Specific Security Configurations of Packets:

As one example, a configuration may indicate whether packets should be fully encrypted (both packet headers and packet payload) or should be partially encrypted (only packet headers) or only specific fields should be encrypted. A case could be, targeting future evolutions of mobile network architecture, the in-network usage of upper-layers such as QUIC. In a scenario like this, if QUIC is used as protocol for the user plane, radio encryption might not be necessary at all as QUIC already provides encryption, or encryption would be needed only to newly added network headers. In this example, our invention could be used to dynamically understand whether a certain traffic is using QUIC as transport layer, and accordingly disable radio encryption only for this traffic (or set encryption only for packet headers) without the need of having separate configurations for each radio bearer.

II) Specific Settings of Network Sublayers:

As one example, a configuration may indicate whether a network sublayer should perform in-order delivery of packets to upper-layers or not, or whether a network sublayer should perform ARQ, etc. A case could be, e.g., for TCP-based applications it might be better for e.g. PDCP to offer in-sequence delivery and e.g. for RLC to perform ARQ. Whereas, for QUIC-based applications, it might be better to avoid in-sequence delivery and ARQ. In this example, embodiments could be used to dynamically understand whether a certain traffic is using TCP or QUIC as transport layer, and accordingly set in-sequence delivery and ARQ (vs the legacy scenario where these settings should have been already pre-configured and available).

As another example, a configuration may indicate whether the network should support loss-less and/or duplication free packet handling at mobility, which may include packet forwarding, synchronization of state machines after a handover; or if this functionality instead should be handled by upper layer. A case could be, targeting future evolutions of mobile network architecture, the in-network usage of upper-layers such as QUIC. In a scenario like this, if QUIC is used as protocol for the user plane, QUIC might be used to handle re-transmission of lost packets due to mobility events (instead of having e.g. PDCP handling this via buffer forwarding between source and target PDCP entity). In this example, embodiments could be used to dynamically understand whether a certain traffic is using QUIC as transport layer, and accordingly disable e.g. PDCP buffer forwarding at handover events and re-transmission of lost PDUs which will be instead handled by QUIC.

As another example, a configuration may indicate whether the network should perform any traffic shaping functionality, e.g. at congestion, or if this functionality should be provided end to end. A case could be, e.g., having a transport protocol such as QUIC which is integrated within the network as part of user plane functionalities. In this example, embodiments could be used to dynamically understand whether a certain traffic is using QUIC as transport layer, and accordingly disable traffic shaping functionalities at e.g. RLC or MAC layers as these will be handled by upper-layers such as QUIC.

As another example, a configuration may indicate whether the radio network should utilize multi-connectivity functionality and split the data flow over multiple radio legs (e.g. frequency bands, radio access technologies, cell types) or if single leg should be used for the data flow. A case could be, e.g., for TCP-based applications it might be better to use only a single leg as usage of multiple legs might negatively impact the congestion algorithm of TCP, while protocols such as multi-path TCP (MP-TCP) or QUIC (and multi-path QUIC) the usage of multi-connectivity might not cause any issue. In this example, embodiments could be used to dynamically understand whether a certain traffic is using TCP, and consequently either disable radio multi-connectivity (UE will be connected always to only link) or setup multi-connectivity in a way that only one link at a time will be active (e.g., UE can be connected to multiple links but user plane traffic will be handled by only one link), whereas if multi-path TCP or QUIC (and multi-path QUIC) are used at upper-layers then radio multi-connectivity can be enabled to allow the transfer of user plane traffic for the UE using more than one radio link.

As another example, a configuration may indicate whether the radio network should utilize multi-connectivity functionality or if this functionality should be provided by upper-layers. A case could be, targeting future evolutions of mobile network architecture, the in-network usage of upper-layers such as QUIC. In a scenario like this, if QUIC is used as protocol for the user plane, QUIC might have multi-path capabilities and then might handle multi-connectivity instead of radio protocols (e.g., instead of having dual connectivity at PDCP). In this example, embodiments could be used to dynamically understand whether a certain traffic is using multi-path QUIC as transport layer, and accordingly disable e.g. dual-connectivity at PDCP as multi-connectivity will be instead handled by multi-path QUIC.

As another example, a configuration may indicate whether re-transmission of lost packets due to mobility events should be activated (instead of having e.g. PDCP handling this via buffer forwarding between source and target PDCP entity). In this example, embodiments could be used to dynamically understand whether a certain traffic is using QUIC as transport layer, and accordingly disable e.g. PDCP buffer forwarding at handover events and re-transmission of lost PDUs which will be instead handled by QUIC.

As another example, a configuration may indicate whether a network sublayer should report experienced congestion (e.g., packet drop due to full buffer) for a certain data flow or predicted congestion for a certain data flow, or should report recommended or predicted bitrate, etc. A case could be, e.g., a service indicating explicit congestion notification (ECN) support into the IP header. In legacy networks, a different 5QI should be used for this traffic so that SDAP can understand which radio bearer to map the traffic to, where such radio bearer has been configured (e.g., PDCP and RLC) to e.g. have separate queue for ECN traffic and to report congestion events (e.g. RLC) and to perform ECN bit marking (e.g. PDCP). With this approach, there is a mix between which QoS the service wants (5QI) and how the radio bearer for the traffic should be configured (e.g., whether ECN bit marking should be performed). In some embodiments, the two aspects listed above are split, e.g., a layer (e.g., SDAP) can perform QoS mapping by selecting the appropriate 5QI for the traffic, and in-parallel can check the upper-layers to understand e.g. if ECN should be provided and accordingly setup the relevant protocol layers (e.g., PDCP and RLC).

III) Specific Operational Capability of Network Sublayers:

An example could be related to how to handle retransmissions, e.g., combining of initial and retransmission of data given that retransmission is of redundancy version (RV) 0 (where RV 0 may mean re-transmits the exact copy of initial transmission (a self-decodable transport block (TB)), RV 1 may mean transmits with a different coding (which are not self-decodable), etc.). This is an example where the functionality can specify recommendations-based actions to transmitter/receiver. Here, in this example, we allow retransmission that it is not necessary to combine with initial transmission because retransmission is a self-decodable TB, which can be independently decoded without combining with initial transmission, however there is little downside that probability of transmission success which will be less than would have been with combining. However, such recommendation would be necessary, e.g., if buffer at receiver is extremely small, or does not engage in storing data of failed received/erroneous data belonging to non-URLLC transmissions due to URLLC transmissions taking over the priority over buffer. If there is initial transmission in the buffer, then combine it otherwise try to decode retransmission independently.

Figure 4:
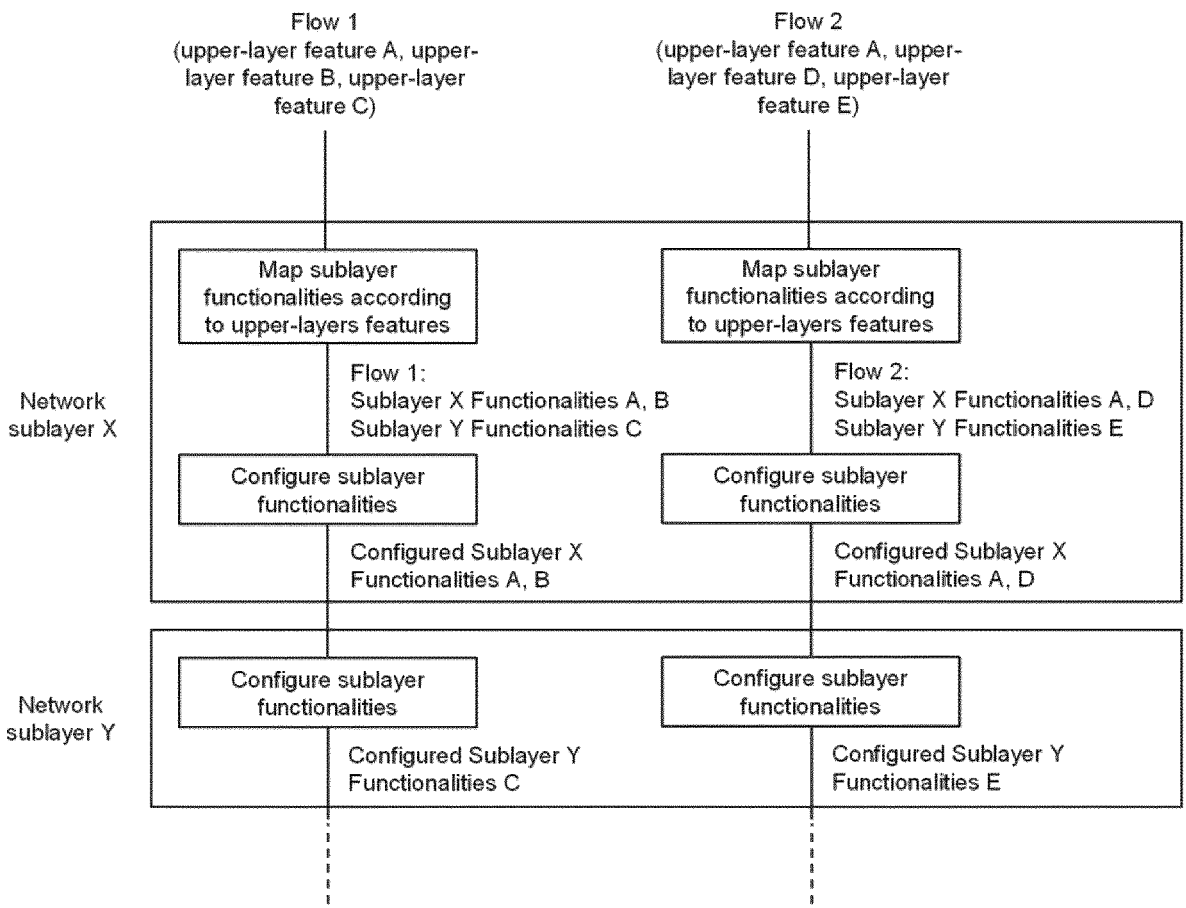
FIG. 4 illustrates an embodiment.

Referring now to FIG. 4, FIG. 4 illustrates an example embodiment. FIG. 4 illustrates how the network protocol stack understands which specific functionalities to use in radio protocol sublayers depending on which features are used in upper-layers of the traffic. FIG. 4 highlights that the embodiments enable the differentiation of network sublayer functionalities for different data flows (flow 1 and flow 2 are associated to two different sets of network sublayer functionalities). One example is the case when, e.g. QUIC is used in flow 1, network sublayer X for flow 1 is configured with the functionality to encrypt only packet headers and network sublayer Y for flow 1 is configured with the functionality to disable in-order delivery. If, for example, flow 2 uses TCP and an IP PDU indicates that ECN is supported, network sublayer X for flow 2 is configured with the functionality to encrypt the whole packet, and network sublayer Y for flow 2 is configured with the functionality to provide in-order delivery and to perform ECN bit marking.

Network Provides Configuration Mappings

Figure 5:
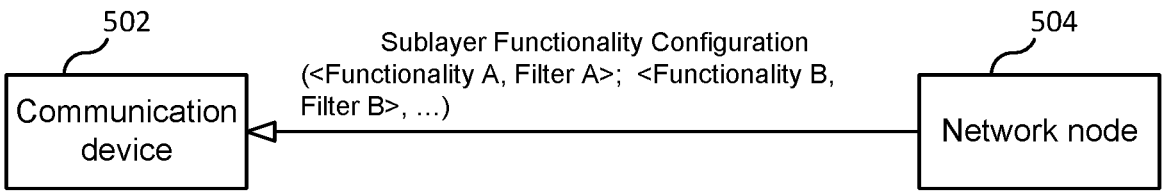
FIG. 5 illustrates a communication device obtaining a sublayer functionality configuration.

FIG. 5 illustrates an embodiment in which a network node 504 provides to a communication device 502 (e.g., UE, UPF, etc.) a sublayer functionality configuration that maps upper-layer configurations to sublayer configurations. The sublayer functionality configuration may indicate all sublayer functionalities of relevance for a network sublayer and how to map (i.e., when to use) such sublayer functionalities. The sublayer functionality configuration may contain a set of entries, wherein each entry contains i) a functionality indicator and ii) a filter.

The functionality indicator indicates the specific sublayer functionality (e.g., encrypt only packet header) and the network sublayer it refers to. The sublayer functionality might be indicated in different ways, e.g., by a sublayer functionality identifier (ID) which refers to both functionality and sublayer (e.g., "functionality A" means "sublayer X performs only encryption of packet header"), or by associating to a functionality ID (e.g., "Functionality A" referring to "encrypt only packet headers") the information about which sublayer it refers to, e.g., "Functionality A, sublayer X".

The filter includes information indicating when a certain sublayer functionality should be applied. The filter might include, but is not limited to, one or more of:

Session type (e.g., PDU session type for example IP type, ethernet type, etc.), used in case the sublayer functionality is applied only to certain traffic type;

Data flow or QoS information (QFI, or 5QI, etc.); used in case the sublayer functionality is applied only to certain data flows and to a certain QoS;

Upper-layer configuration; this can be used to indicate that the sublayer functionality is applied depending on specific upper-layer features, where examples of upper-layer features can be found above (e.g., this field could indicate that functionality A has to be used only when QUIC is used in the upper-layers, etc.);

Dependent sublayer functionalities; used to indicate that a certain sublayer functionality should be used (or avoided, or conditional usage) if another certain sublayer functionality is used; for instance, this field might indicate that Functionality A should be used only if Functionality B applies to the data flow, etc; and Additional conditions; used to indicate whether the sublayer functionality should be used only in particular case; for example, an additional condition might be that the sublayer functionality is used if there are packet drops or congestion in a certain network sublayer, and/or if load >X %, and/or if average latency has increased, and/or if average retransmission has increased, and/or if bit rate has dropped for a given service, etc.

The sublayer functionality configuration could be a static configuration provided e.g. to a UE during attachment or registration procedures or provided to a RAN node or core network node during configuration setup. Or it could be a dynamically updated configuration. The sublayer functionality configuration might be UE and/or subscriber dependent. Examples of possible configuration options might be: a communication device can be pre-configured (e.g., up to implementation); UE receiving a configuration via some control signaling from the base station (e.g. NAS/RRC); a base station or a network function receiving a configuration from another network function or from management system. Once the sublayer functionality configuration is received, the communication device (a.k.a., "network entity) processes the configuration and stores it (and/or updates an existing configuration). The configuration might be needed to be received and potentially also stored in different layers, e.g., a layer such as SDAP might be a receiver as it interacts with upper-layers and could perform the mapping for a certain traffic, while a layer like RRC might be a receiver as well in order to get information on which functionalities to be configured to sublayers of the stack (an example is SDAP receiving the information that e.g. if there is QUIC at upper-layers there is no need to have in-sequence delivery and radio encryption, whereas RRC receiving the information that PDCP could be configured to have/not have in-sequence delivery and radio encryption).

The sublayer functionality configuration can be used in different ways. For example, in a basic scenario, it is used by the communication device to understand how to perform the mapping of upper-layer configurations to sublayer configurations. In this case, the process is transparent to upper-layers.

In a more advanced scenario, the communication device might expose the sublayer functionality configuration to upper-layers, so that upper-layers are aware of which features to set up in order to use/benefit from certain network features. This opens to two possibilities. First, the service is aware of how the network will treat the traffic and will set up the upper-layers accordingly. For example, if the sublayer functionality configuration indicates that radio protection (encryption) is turned off when QUIC is used, then the upper-layers know that QUIC shouldn't be used if radio protection is important for the service (or that a stronger encryption at application layer should be applied). Second, the service is aware of which sublayer functionalities are possible in the network and can directly inform the network about which functionalities the service wants. For example, targeting future evolutions of upper-layers, one can think of new fields in the upper-layers to be used to indicate e.g. whether radio protection is wanted or not. If the service is aware that the network sublayer functionality of radio protection can be turned on/off, then the service can set the upper-layers to directly indicate that radio protection should/ shouldn't be used. The communication device may offer an API to upper-layers to retrieve the relevant information on the available sublayer functionality configuration.

As the above demonstrates, the embodiments enhance a radio network protocol stack with the capability of dynamically selecting the UP functionalities to be used for a certain traffic based on upper-layer configuration, instead of being based only on semi-static network configuration per communication device (e.g., per-cell).

Mapping Sublayer Functionalities

A protocol layer of a communication device that receives data and has visibility of upper-layers selects a configuration for a lower protocol layer based on the available sublayer functionality configuration and according to the configuration of one or more upper-layers (e.g., features of the received data).

Figure 6:
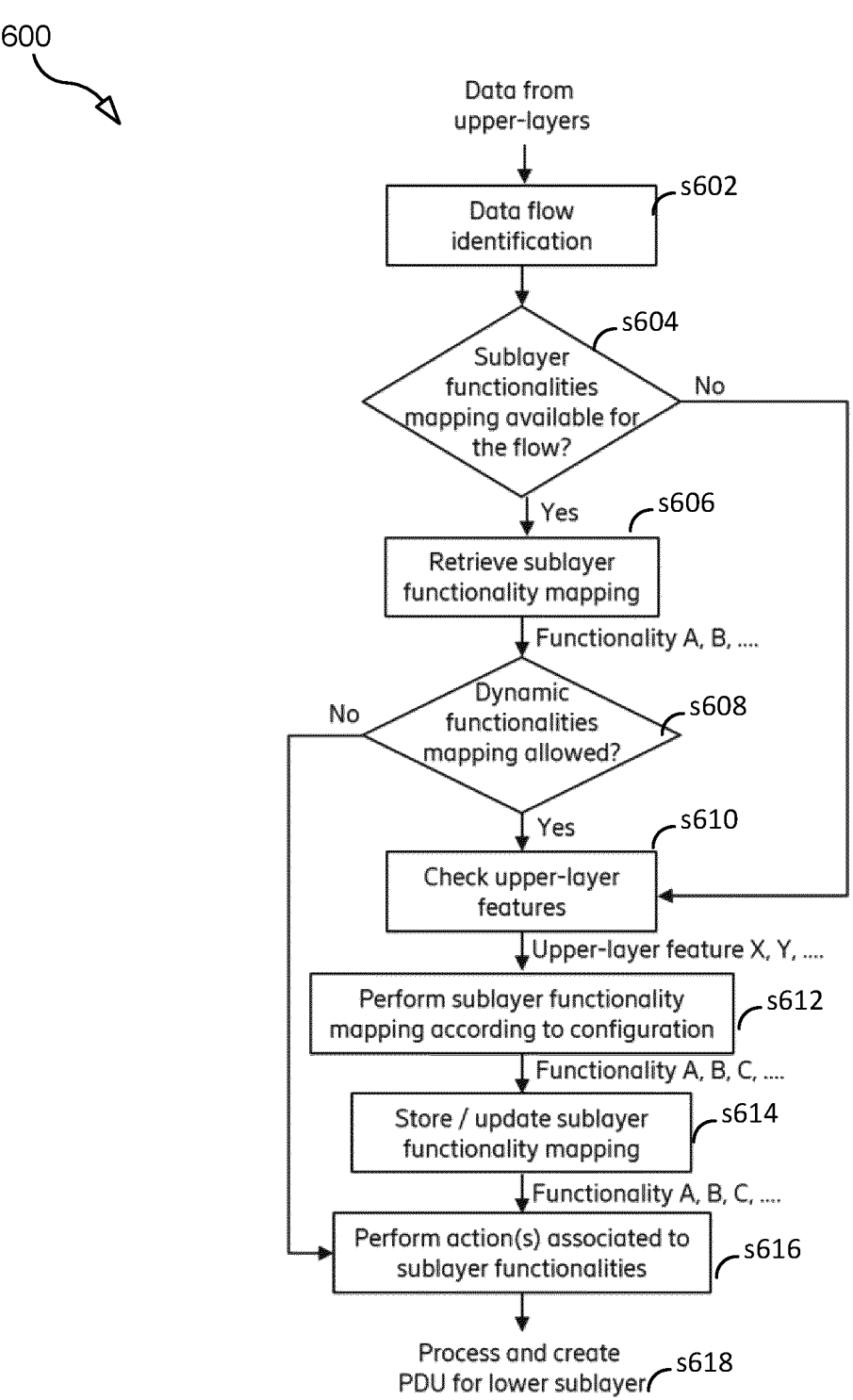
FIG. 6 is a flowchart illustrating a process according to some embodiments.

FIG. 6 is a flowchart illustrating a process 600 performed by communication device according to some embodiments. More specifically, the steps of the process are performed by a protocol layer of the communication device (e.g., the SDAP layer or PDCP layer). This protocol layer that performed process 600 will be termed the "network sublayer." Process 600 may begin in step s602.

Step s602 comprises the network sublayer, after receiving a data (e.g., a PDU) from the layer directly above the network sublayer in the protocol stack, identifying the data flow of which the data is a part. The data flow could be identified in different ways. Assuming that the data is user plane data, the data flow could be identified as a QoS Flow of a 5GS, but other ways of defining the data flow (granularity, etc.) are applicable as well. This could be performed in several ways, including but not limited QoS rules, SDF filters, 5-tuple filtering, Packet Detection Rule (PDR), etc. After this step, the network sublayer is aware of the flow to which the received data belongs, thus allowing the network sublayer to be aware of the QoS characteristics to be associated to the flow. This step could be similar to what SDAP does in 5GS in terms of mapping a data flow to a certain DRB, 5QI/QFI, etc.

Step s604 comprises the network sublayer determining whether there is a sublayer functionality mapping available for the flow under consideration. If this is not the case, then the diagram flow continues to step s610, otherwise flow continues to step s606.

Step s606 comprises the network sublayer retrieving the sublayer functionality mapping associated to the flow/traffic (i.e., sublayer functionalities A, B, . . . , are applied to the traffic/flow).

Step s608 comprises the network sublayer checking whether dynamic change of sublayer functionalities for an on-going flow is allowed. This setting might be related to, for example, pre-configuration, or depending on capabilities of the protocol stack. If dynamic functionalities mapping is allowed, the flow continues to step s610, otherwise to step s616.

Step s610 comprises the network sublayer checking the upper-layer features of the received data. If a mapping of sublayer functionalities is available at the network sublayer and the network sublayer is configured to dynamically change functionalities for an on-going flow, the network sublayer checks whether there has been a change of upper-layer features w.r.t. last received traffic. After this step, the network sublayer knows that e.g. upper layer features X, Y, . . . , are associated to the traffic/flow.

Step s612 comprises the network sublayer performing sublayer functionality mapping for the data flow according to the available sublayer functionalities configuration (discussed above) and the associated upper-layer features. The mapping could include only sublayer functionalities associated to the sublayer under consideration, as well as sublayer functionalities relevant to other sublayers of the network protocol stack. After this step, the network sublayer is aware of which sublayer functionalities should be applied to the data flow according to flow characteristics and upper-layer features (i.e., sublayer functionalities A, B, C, . . . , are applied to the traffic/flow).

Step s614 comprises the network sublayer storing or updates the sublayer functionalities mapping for the flow.

Step s616 comprises the network sublayer performing the action(s) associated to the sublayer functionalities associated to the traffic. Action(s) might include, but are not limited to:

The network sublayer (e.g., SDAP) providing the RRC entity with the information identifying the sublayer functionalities to be applied to the data flow (e.g., sublayer functionalities A, B, C) so that the RRC entity can configure the selected functionalities at the relevant protocol layer (e.g., SDAP influences the configuration based on upper-layer features). In addition, such (re) configuration based on upper-layer features can be performed per PDU/PDN session basis during the establishment phase or during an on-going PDU/PDN session.

The network sublayer configuring itself. For example, if the mapping indicates that the network sublayer should apply a certain sublayer functionality A (e.g., "encrypt only packet headers" or "encrypt the whole packet"), then the network sublayer configures these functionalities for the data flow.

In case the mapping is done also for other network sublayers of the network protocol stack, the network sublayer configuring other sublayers or of indicating the functionalities to use to other sublayers. In this case, one approach might be that the network sublayer interacts directly (internal cross-layer interaction) with the other sublayers to directly indicate which network sublayer functionalities to use. Another approach might be that the network sublayer interacts with the other sublayers by introducing particular fields in subheader(s) of the generated PDU. In this case, such information could be, e.g., in the form of particular fields in the header of generated PDU, where such headers might contain e.g. a functionality ID e.g., in the form of additional tags associated to the identifiers of the flow (e.g., tags indicating that Functionality A has been associated to a certain QFI).

Determining and/or setting up specific queues to be used for the flow, initiating specific counters, updating specific counters, performing specific data processing, etc.

Step s618 comprises the network sublayer processing the data from upper-layers and generating a PDU to be delivered to relevant lower sublayer (i.e., the protocol layer beneath the network sublayer). For example the generated PDU includes a header portion and a payload portion and generating the PDU comprises including the received data in the payload portion.

As noted above, how the actual sublayer functionalities are setup at the relevant sublayers might vary. One approach is that the sublayer in charge of performing the sublayer functionality mapping (e.g., SDAP), performs the mapping of network sublayer functionalities according to the upper-layers and then provides the mapping to RRC so that RRC can configure the relevant sublayers according to such mapping (e.g., SDAP checks that QUIC is used at upper-layers, it maps that in-sequence should not be provided and then asks RRC to perform the "in-sequence delivery off" configuration at PDCP). Another approach is that the sublayer in charge of performing the sublayer functionality mapping (e.g., SDAP) is also in charge of configuring the other sublayers, this can be accomplished either via direct interaction (internal cross-layer interaction) with the other sublayers or by adding specific tags/fields in the PDU generated by the sublayer in charge, which contain the information of which functionality a certain sublayer should configure (then, the relevant sublayer reads the tag/field and configures the functionality accordingly).

A similar diagram flow can be considered by other network layers when receiving data from an above layer or a below layer. One example is for instance a MAC layer receiving a PDU from, e.g., SDAP or PDCP. Another example is for instance a sublayer (e.g., SDAP/PDCP) which receives a PDU from a below layer (e.g. RLC/MAC). In this case, the network layer X under consideration could retrieve the layer functionalities to use in different ways, examples are: (i) the received PDU might have some flags/ information indicating which functionalities the layer X should use (i.e., functionality mapping performed by another layer); (ii) the layer X could map the functionalities to use according to some traffic information (e.g., configured sublayer functionalities for a certain 5QI/QFI/bearer/flow/ etc.); (iii) the layer X could map the functionalities to use according to some flags/information indicating which functionalities are used by other layers (i.e., layer X uses functionality C if functionalities A, B are applied to the traffic/flow). Considering the actions that a layer can do when receiving data from other layers (as in step 8 of the diagram in FIG. 6), examples include but not limited to:

Sublayer functionality configuration, e.g., if the mapping has as output that the sublayer should apply the sublayer functionality "avoid re-transmissions", then sublayer configures and uses this functionality. This setup can be triggered either based on indications received from the sublayer in charge of performing the sublayer functionality mapping or based on checking the information contained in the headers of the received PDU from other network sublayer.

Add specific information to indicate to the relevant sublayer at the reception side the sublayer functionalities used. This specific information could be, e.g., in the form of particular fields in the header of generated PDU, where such headers might contain e.g. an indication of which functionalities are associated to the flow (e.g., functionality ID). In this way, e.g., a PDCP at the sender side sets e.g. in-sequence delivery for the traffic, and adds a field in the header of the generated SDU that, when read by the PDCP layer at the receiver side, will allow the receiver PDCP to understand that in-sequence delivery should be applied.

Set up/determine specific queues to be used for the flow, initiate/update specific counters, perform specific data processing, etc.

Compute and/or add specific information associated to certain sublayer functionalities. Examples could be measurements/predictions/recommendation, e.g., if a sublayer functionality is a congestion-/throughput-related functionality, the sublayer could add information about measurements/predictions/recommendation of congestion/throughput. Another example is that, if a network sublayer is in charge of handing a congestion notification functionality, it adds the information that congestion occurred/is expected to occur/is terminated as an additional field in the generated SDU, so that another network sublayer can utilize this information (e.g., an RLC/MAC sublayer adding a field to indicate that congestion occurred for a certain queue).

Copy and/or modify information relevant to sublayer functionalities introduced by other sublayers. Multiple options with establishing the sublayer functions depending on if the information from other sublayers is present or absent.

Map/set certain information to upper-layers (e.g., specific fields of upper-layers header) based on the information relevant to sublayer functionalities. One example is a network sublayer which interacts with upper-layers, which maps information relevant to a sublayer functionality about congestion (e.g., congestion information in e.g. PDCP/RLC/MAC header) to the relevant fields of upper-layers (e.g., map to ECN field of IP header).

Add functionality of changing service characteristics or class depending on the situation such as situations with congestion, resource constraint, etc. For example, a service can be re-classified, if there is congestion, to other class in order to bypass the congestion, and thus able to secure the resources with new class category. For example, if critical service is congested, then the new critical service data in queue could be serviced as non-critical service if non-critical services are not facing congestion. Even though probability of success lowers but it's still better than waiting in queue where the packet may run out of its latency budget and ultimately deemed unsuccess. The adaption can be applied to currently served packet, where MAC or RLC based retransmissions switched with different service characteristics compared to its initial transmission.

Add prospective information regarding possible suggestions related to the specific network situation and specific sublayer functionalities. For example, in case of sublayer functionalities associated to network congestion, the sublayer might add suggestions indicating that congestion might not be encountered if the connection would have established with neighboring gNB(s) or if traffic priority would be changed, etc. Or, for instance, in case of DC, one MAC sublayer could add the suggestion that, e.g., it could be better if the traffic over that leg would be decreased of X % or, e.g., the it would be fine with an increase of Y % of traffic over that leg, thus allowing PDCP sublayer to take better decision on traffic split. In one example, the prospective information can be added related to probabilistic measure of the traffic for different services or priority traffic in this gNB and neighboring gNBs.

EXAMPLES

The embodiments can be used at different layers of the radio access protocol stack. Considering the embodiments applied to user plane protocol stack, the functionality of mapping the sublayer functionalities stack based on the features of upper-layers might be implemented (but not limited to) at SDAP sublayer (considering 5G protocol stack) of a UE or UPF or other communication device (e.g., centralized unit (CU) UP), as this sublayer interacts directly with upper-layers and has the capability of processing the content of upper-layers.

Considering a different implementation potentially targeting future protocol stack evolutions, the embodiments can be implemented in a network sublayer of e.g., a UE which interacts with e.g. QUIC layer. In a scenario with a different UP architecture w.r.t. 5G, the embodiments could be implemented in a network sublayer of a user plane entity/function in a mobile network (e.g., a network sublayer of a UPF considering a 5GS or of a UP functionality considering different implementation with a most of user plane processing only in core and not in RAN) which interacts with and can process upper-layers of data packets.

Considering an implementation at SDAP layer, for a certain traffic, in 5G SDAP performs mapping between a QoS flow and a DRB, in the embodiments described herein SDAP can also perform the identification and mapping of UP functionalities for the traffic.

Usages of the embodiments can be used to differentiate UP sublayer configuration for two service realizations (A and B). Service realization A uses HTTP2/TLS/TCP, whereas service realization B uses HTTP3/QUIC, and let's assume that the network can use two different configurations of UP functionalities (one for HTTP2/TLS/TCP and one for HTTP3/QUIC). For example purposes, let's say that for service realization A the UP configuration (UP configuration A) could be "in-order delivery on; radio encryption on, acknowledgment mode (AM)," while for service realization B, the UP configuration (UP configuration B) could be "in-order delivery off; radio encryption off, un-acknowledgment mode (UM)."

An example is the case of an application changing from service realization A to service realization B. In a legacy 5G scenario, if this happens, then we have that: (i) packet filtering rules should be updated to map the traffic to the correct flow/bearer as changing from HTTP2/TLS/TCP to HTTP3/QUIC means that port numbers associated to the application are changed; (ii) signaling to re-configure the flow/bearer for the traffic of the application is needed as now the UP needs to run with a different configuration with consequent overhead introduced over the air interface plus some latency in flow/bearer configuration update. With the embodiments disclosed herein, the network sublayer in charge of determining the UP sublayer configuration, e.g., SDAP, receives data (e.g., PDUs) from the upper layers and understands that HTTP2/TLS/TCP is not used anymore and that instead HTTP3/QUIC is used (e.g., by checking that UDP port 443 is now used while before the TCP port 443 was used). Noticing the change, SDAP then retrieves the configuration previously provided by the network which e.g. says "HTTP3/QUIC: in-order delivery off; radio encryption off, UM mode". Now, two options (and a combination of them) can be considered:

Option 1. SDAP informs RRC on which functionalities should be setup to the other sublayers (in-order delivery off; radio encryption off, UM mode) and RRC sends appropriate signals to such sublayers to configure them accordingly. Following the example above, RRC configures PDCP to disable in-order delivery and radio encryption for this traffic, and RLC to use UM mode for this traffic.

Option 2. SDAP sends indications to relevant sublayers about the functionalities they should use for the traffic, i.e., SDAP indicates to PDCP to disable in-order delivery and radio encryption for this traffic, and to RLC to use UM mode for this traffic. In this case, PDCP could add some tags/fields in the header of the PDCP PDU to inform the receiver PDCP entity that in-order delivery and radio encryption should be disabled for this traffic. Similarly, RLC could add some tags/fields in the header of the RLC PDU to inform the receiver RLC entity that UM mode should be used for this traffic. The sublayers at the receiver side will finally check the sublayer configuration information to retrieve and apply the same configuration used by the sender side. As one can notice, in this realization there is no need of additional control signaling over the radio interface to update the configuration of the UP stack.

In the following examples, either option 1 or option 2 above for the actual configuration of network sublayer functionalities can be used, but for the sake of simplicity, following examples will consider only option 2.

Another example is related to the case of network changes involving different UP configurations. For instance, in a certain region, a network is using the same UP configuration for HTTP2/TLS/TCP and HTTP3/QUIC: "in-order delivery on; radio encryption on, AM mode." At some point, for example, based on the knowledge extrapolated from an AI agent, the network understands that HTTP3/QUIC can improve its experienced quality by using the UP configuration "in-order delivery off; radio encryption off, UM mode." In legacy networks, this is achieved by issuing a request to update the traffic mapping configurations (to distinguish between HTTP2/TLS/TCP and HTTP3/QUIC traffic and to associate these to different bearers) as well as to update the radio bearer configurations for all UEs served in that area. With the embodiments disclosed here, this could be achieved by providing only the update UP configuration mapping to the UEs (instead of re-configuring all the radio bearers to which the HTTP3/QUIC traffic is associated) which in turns allows network sublayers (e.g., SDAP) to differently configure the UP sublayers depending on the upper-layers (the actual UP configuration follows the same steps as in the example above).

Another example is adapting network configuration for improving performance for an ongoing service. A case, e.g., for services using QUIC in the upper-layers, could be a network configuration where the sublayer functionality "in-sequence delivery" is enabled only when QoS requirements are fulfilled, but when the QoS requirements are in danger of being violated, then "in-sequence delivery" is disabled to allow quicker reception of packets at upper-layers. In this example, a network sublayer (e.g. SDAP), after checking that upper-layers support QUIC, might select the "in-sequence delivery only if QOS is fulfilled" functionality—i.e., indicating to PDCP to perform in-sequence delivery and indicating e.g. to RLC to report congestion events or e.g. to MAC to report QoS unfulfillment events. If RLC indicates congestion events or MAC indicates QoS unfulfillment events, this triggers PDCP to disable "in-sequence delivery".

Another example of UP configuration is for service realization A (HTTP2/TLS/TCP) and service realization B (HTTP3/QUIC), the UP should be configured to perform encryption of packets only on a portion of a packet (e.g., encryption only of packet headers or of specific fields of the packet header). In this example, the network sublayer in charge of determining the UP sublayer configuration, e.g., SDAP, receives traffic from the upper layers and understands that either HTTP2/TLS/TCP or HTTP3/QUIC is used (e.g., by checking that TCP or UDP port 443 is used), SDAP indicates to PDCP that "encryption: headers only (i.e., no payload encryption)."

Another example of UP configuration is network congestion notification when required by upper-layers with, e.g., indication of Explicit Congestion Notification (ECN) support in the IP header. In this example, the network sublayer in charge of determining the UP sublayer configuration, e.g., SDAP, receives traffic from the upper layers and checks if IP headers are marked with ECT(0) or ECT(1) (indicating that ECN is supported by the application). If so, SDAP indicates "ECN on" to e.g., RLC, then it understands that the queue for this traffic should be monitored to notify cases of congestion (e.g., queue level above a certain threshold or queue drops). When congestion occurs, the RLC entity in charge of congestion marking adds a field in the header of the constructed PDU indicating "congestion occurred." When the receiving RLC entity (e.g. at UE) processes the PDU, it sees the field "congestion occurred" in the header, and it translates it to an indication to e.g. PDCP for setting the Congestion Encountered (CE) codepoint in the IP header. In this example, we see that the embodiments can be also used to translate information between upper-layers and network layers, and also to carry upper-layer relevant information across network entities.

With a more long-term focus, one could think about future enhancements to capabilities of upper-layers, e.g., new fields in the headers of, for instance, IP packets indicating whether a certain network functionality should/should not be used. This opens the opportunity for an application to tell the network how it wants its traffic to be treated.

One example is the following. An application is carrying sensitive traffic, the application has a list of trusted networks (e.g., a list of dedicated networks) and when the application connects via any of these trusted network the application does not need radio encryption, which should instead be used otherwise. In this case, the application can use the new header fields of upper-layers (e.g., IP) to indicate to the network whether "radio encryption is needed" or "radio encryption is not needed" based on its list of trusted networks. The network sublayer in charge of determining the UP sublayer configuration, e.g., SDAP, receives traffic from the upper layers, checks the information indicating what the application requires from the network, and indicates to PDCP whether "radio encryption is needed" or "radio encryption is not needed."

In the same long-term direction, one could think about future enhancements to capabilities of upper-layers, e.g., new upper-layers or new protocols for the interaction between upper-layers and network to allow applications to inform a lower layer about the application's intent, goals, and/or characteristics. This opens to the opportunity for an application to tell a lower layer what the application wants to achieve with the communication, and gives awareness about this to the lower layer so the lower layer can configure itself and/or other layers to fulfill this goal.

As example, an application is designed to be very resilient to losses and can tolerate very high levels of losses under the assumption that packets are delivered as soon as possible. In this case, the application tells a lower layer that "I am resilient, but I need packets to be delivered as soon as possible." In this example, the network sublayer in charge of determining the UP sublayer configuration, e.g., SDAP, receives traffic from the upper layers, checks the information from the application, and performs a check to understand which sublayer configuration is the best to support the application. Let's say that for instance the configuration is "in-order delivery is not needed; radio encryption is not needed, UP buffer forwarding at handover is not needed, UM mode is needed, HARQ feedback mechanism is not needed" and accordingly indicates this to other layers (e.g., PDCP). The other layer(s) receives the indication that it should not encrypt the traffic, it should not perform in-order delivery, and that in case of handover the UP buffer should not be forwarded to target gNB. For example, the RLC layer receives the indication that it should use UM mode for the traffic, and the MAC layer receives the indication that it should not use HARQ feedback for the traffic. In this example, upper-layers are used by the application to inform the protocol stack about its capabilities and communication needs, and then the protocol stack applies what it considers to be the most useful sublayer configuration to support application's needs.

In the examples above, the examples are focused on the case of tuning the network sublayers based on upper-layer configurations for a certain service/application, but this is not the only use case. For example, the above examples can be extended also to future evolutions of network architecture. For instance, current network capabilities might evolve, e.g., considering the usage within the network architecture of upper-layer features. An example could be a L4-based user-plane proxy based on TCP or QUIC where there is a TCP/QUIC end-point at the UE and within the network. In this scenario, the embodiments could be used in the interaction between the network user-plane proxy and the radio network layers, so that radio sublayers could be configured based on how the network upper-layers are configured and/or on what they need from the radio protocols.

The embodiments can work with different approaches (and a combination of these approaches). In one approach, a network sublayer or other entity can choose which sublayer functionalities to use according to upper-layer features. An example is, e.g., the network sublayer checks the upper-layers to verify whether QUIC is used and accordingly decides to switch-off radio encryption if QUIC is used because e.g. QUIC already provides encryption and in this way there is less computation load for the network.

Another approach is that a network sublayer or other entity sets the sublayer functionalities according to specific requests from the upper-layers. This case targets future evolutions of network-application interaction, considering for instance the case where novel features (e.g. new fields or new protocols) in the upper-layers are introduced allowing the application to tell the network what is required and/or preferred. An example is an application using new features of the upper-layers to tell the network "I don't want encryption," the network by checking the upper-layers consequently sets the network sublayers to avoid radio encryption.

Another approach is that the network sets the sublayer functionalities based on an intent (e.g. goal) indicated from upper-layers. Also this case targets future evolutions of network-application interaction, but w.r.t. previous bullet here the features (e.g. new fields or new protocols) in the upper-layers are introduced allowing the application to tell the network what is desired from an high-level (intent) point of view. An example is an application using new features of the upper-layers to tell the network "my goal is to maximize throughput," then network is aware that it should set the sublayers to fulfill this intent (in this case the network has the freedom to choose what is considered the best configuration to achieve the intent while in the previous bullet the network was reacting to follow directly indications from upper-layers).

Please note that upper-layers could be either upper-layers of an application or upper-layers used in the network (e.g., for network enhancement use cases where protocols like QUIC are integrated as part of network protocols).

FIG. 7 is a flowchart illustrating a process 700. The process 700 is performed by communication device 502, which comprises a protocol stack comprising a plurality of layers, the plurality of layers comprising a first layer and a second layer. Process 700 may begin in step s702. Step s702 comprises the first layer generating a first protocol data unit, PDU, associated with a first data flow. Step s704 comprises the second layer obtaining the first PDU. Step s706 comprises, after obtaining the first PDU, the second layer obtaining information about the first PDU. And step s708 comprises, after obtaining the information about the first PDU, the second layer either i) determining, based on the information about the first PDU, a sublayer configuration to be applied to at least one or more PDUs associated with the first data flow or ii) providing to another layer (e.g., RRC, NAS) the information about the first PDU so that the another layer can determine, based on the information about the first PDU provided by the second layer, the sublayer configuration to be applied to the one or more PDUs associated with the first data flow.

In some embodiments the plurality of layers further comprises a third layer that is lower in the protocol stack than the second layer, and the process further includes: the third layer receiving a PDU associated with the first data flow; and after receiving the PDU associated with the first data flow, the third layer processing the received PDU in accordance with the determined sublayer configuration.

In some embodiments the process further includes the second layer processing the first PDU in accordance with the determined sublayer configuration.

In some embodiments the process further includes the second layer generating a second PDU, wherein the second PDU comprises at least a portion of the first PDU, wherein generating the second PDU comprises the second layer including the determined sublayer configuration or an index to the sublayer configuration in the second PDU (the index to the sublayer configuration is an identifier that identifies the sublayer configuration). In some embodiments generating the second PDU comprises adding a header to the first PDU, and including the determined sublayer configuration or the index to the sublayer configuration in the second PDU comprises including the determined sublayer configuration or the index to the sublayer configuration in the header added to the first PDU.

In some embodiments the second layer provides the determined sublayer configuration or the index to the sublayer configuration to another layer using an out-of-band message. In some embodiments the out-of-band message further comprises a flow identifier (e.g., radio bearer, RLC channel, 5 tuple, QoS flow ID) identifying a data flow to which the determined sublayer configuration is to be applied.

In some embodiments the determined sublayer configuration comprises: an encryption indicator, wherein encryption indicator indicates whether not encryption should be applied to PDUs of the first data flow, an in-order delivery indicator, wherein the in-order delivery indicator indicates whether or not in-order delivery is required, an acknowledgement indicator, wherein the acknowledgement indicator indicates whether or not acknowledgements are required, and/or dual connectivity indicator, wherein the dual connectivity indicator indicates whether or not routing for dual connectivity is enabled. In some embodiments the sublayer configuration comprises the encryption indicator, and the encryption indicator indicates: i) that encryption should be applied only to certain parts of the PDUs that belong to the data flow (e.g., header only or only certain fields of the header), ii) that, for each PDU that belong to the data flow, encryption should be applied to the entire PDU, or iii) no encryption should be applied for the data flow.

In some embodiments the communication device further comprises a control plane layer (e.g. RRC), the second layer determines the sublayer configuration, and the process further includes: the second layer providing to the control plane layer the determined sublayer configuration or an index to the sublayer configuration; and the control layer providing to a third layer the sublayer configuration or the index to the sublayer configuration.

In some embodiments the second layer stores mapping information that maps each feature included in a set of features to a different sublayer configuration, the information about the PDU identifies one of the features, and the second layer determines the sublayer configuration to be applied to PDUs associated with the first data flow by determining the sublayer configuration to which the identified feature is mapped.

In some embodiments the communication device further comprises a control plane layer, the second layer provides to the control plane layer the information about the first PDU, and the process further includes: the control plane layer determining the sublayer configuration based on the information about the first PDU; and the control layer providing to the third layer the sublayer configuration or the index to the sublayer configuration. In some embodiments the control plane layer stores mapping information that maps each feature included in a set of features to a different sublayer configuration, the information about the PDU identifies one of the features, and the control plane layer determines the sublayer configuration to be applied to PDUs associated with the first data flow by determining the sublayer configuration to which the identified feature is mapped. In some embodiments the one of the features is a QUIC connection feature and the sublayer configuration to which the QUIC connection feature is mapped comprises an encryption indicator indicating that the third layer should not apply encryption to an entire PDU of the first data flow.

In some embodiments the first PDU comprises a header and payload, and the information about the first PDU comprises at least a first protocol identifier identifying a protocol associated with at least a portion of the payload of the first PDU. In some embodiments obtaining the information about the first PDU comprises determining the protocol based on a protocol identifier included in a protocol field included in the first PDU.

Figure 8:
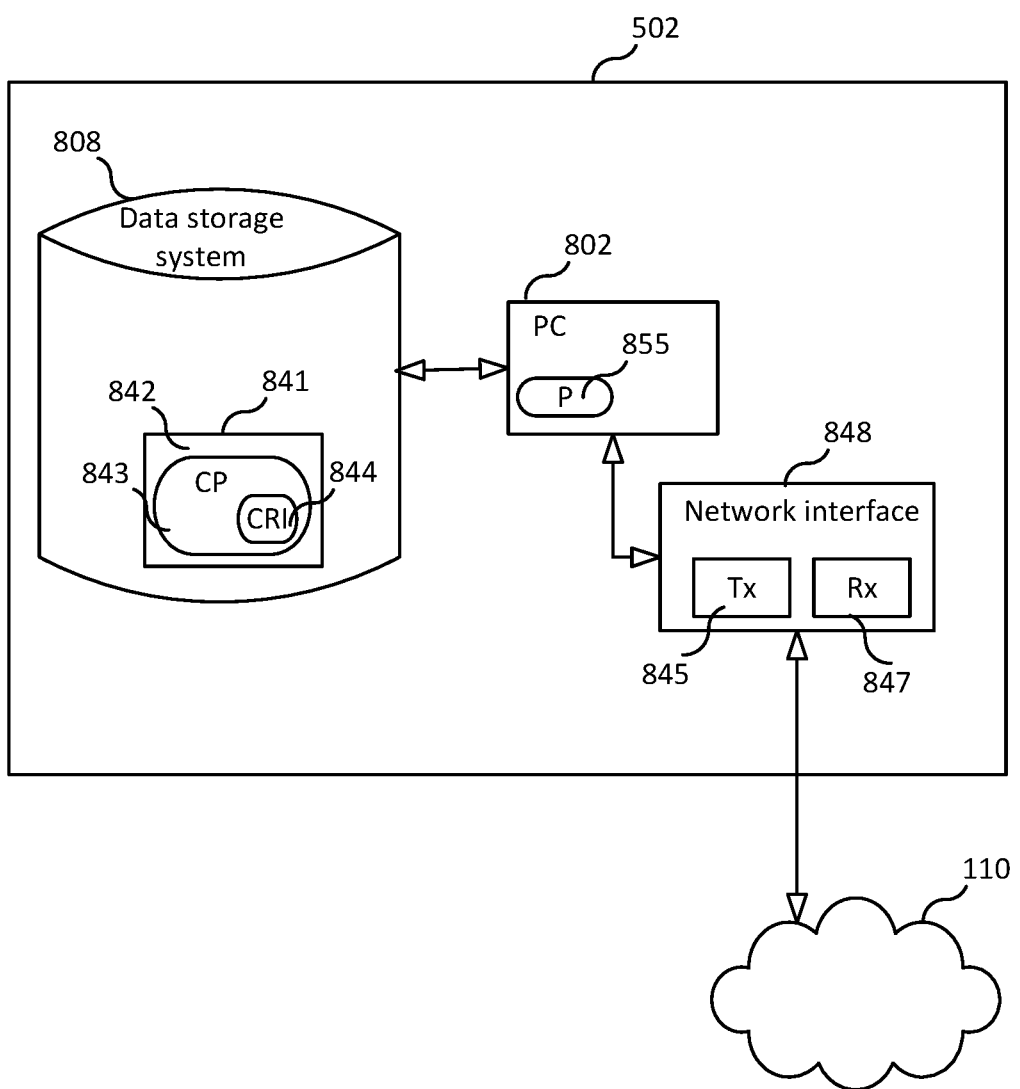
FIG. 8 shows a communication device according to some embodiments.

FIG. 8 is a block diagram of communication device 502, according to some embodiments. As shown in FIG. 8, communication device 502 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., communication device 502 may be a distributed computing apparatus); at least one network interface 848 comprising a transmitter (Tx) 845 and a receiver (Rx) 847 for enabling communication device 502 to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes communication device 502 to perform steps described herein (e.g., steps described herein with reference to the flow charts). In other embodiments, communication device 502 may be configured to perform steps described herein without the need for code. That is, for example, PC 802 may consist merely of one or more ASICs. Hence, the features of the embodiments described herein may be implemented in hardware and/or software.

Conclusion

This disclosure introduces the capability in a mobile network to configure the functionalities of a radio protocol stack for a certain traffic based on upper-layer features (e.g., based on fields in the header of e.g. IP, TCP, QUIC or based on other specific fields/content of received traffic) used by the service the traffic belongs to. Overall, the embodiments can be seen as a new framework upon which the mobile network protocol stack can rely on to associate specific network functionalities or configurations to data flows, in a more flexible way considering the embodiments can be easily extended to support possible enhancements to upper-layer features (e.g., new features of e.g. QUIC protocol) as well as new ways of network-application interaction (e.g., semantic- or intent-based interaction).

The advantages of the embodiments disclosed herein include that a network sublayer has the capability of configuring the functionalities that itself and/or other network sublayers should use for a certain data flow, based on upper-layer configurations. This mapping can be performed when a certain data flow is established as well as while a certain data flow is ongoing to reflect changes of network or application configuration and/or changes of network conditions or application experienced quality.

Another advantage is that the network sublayer in charge of selecting the sublayer functionalities to be used for a certain traffic can in some embodiments interact with another layer (e.g., a user plane sublayer interacting with a control plane sublayer) requiring to setup the previously selected sublayer functionalities to the other network sublayers that will handle the traffic under consideration.

Yet another advantage is that the network sublayer in charge of selecting the sublayer functionalities to be used for a certain data flow can also, in some embodiments, interact directly with the other network sublayers that will handle the traffic under consideration to indicate which sublayer functionalities should be used. In this case, the approach is that the user-plane protocol stack can configure itself without involving the control-plane (targeting a more radical change of approach w.r.t today).

While various embodiments are described herein, it should be understood that they have been presented by way of example only, and not limitation. Thus, the breadth and scope of this disclosure should not be limited by any of the above described exemplary embodiments. Moreover, any combination of the above-described embodiments in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method in a communication device comprising a protocol stack comprising a plurality of layers, the plurality of layers comprising a first layer and a second layer, the method comprising:

the first layer generating a first protocol data unit (PDU) associated with a first data flow;

the second layer obtaining the first PDU;

after obtaining the first PDU, the second layer obtaining information about the first PDU;

after obtaining the information about the first PDU, the second layer either i) determining, based on the information about the first PDU, a sublayer configuration to be applied to at least one or more PDUs associated with the first data flow or ii) providing to another layer the information about the first PDU so that the another layer can determine, based on the information about the first PDU provided by the second layer, the sublayer configuration to be applied to the one or more PDUs associated with the first data flow; and the second layer generating a second PDU, wherein the second PDU comprises at least a portion of the first PDU.

2. The method of claim 1, wherein the plurality of layers further comprises a third layer that is lower in the protocol stack than the second layer, and the method further comprises:

the third layer receiving a PDU associated with the first data flow; and after receiving the PDU associated with the first data flow, the third layer processing the received PDU in accordance with the determined sublayer configuration.

3. The method of claim 1, further comprising the second layer processing the first PDU in accordance with the determined sublayer configuration.

4. The method of claim 1, wherein generating the second PDU comprises the second layer including the determined sublayer configuration or an index to the sublayer configuration in the second PDU.

5. The method of claim 4, wherein generating the second PDU comprises adding a header to the first PDU, and including the determined sublayer configuration or the index to the sublayer configuration in the second PDU comprises including the determined sublayer configuration or the index to the sublayer configuration in the header added to the first PDU.

6. The method of claim 1, wherein the second layer provides the determined sublayer configuration or the index to the sublayer configuration to another layer using an out-of-band message.

7. The method of claim 6, wherein the out-of-band message further comprises a flow identifier identifying a data flow to which the determined sublayer configuration is to be applied.

8. The method of claim 1, wherein the determined sublayer configuration comprises:

an encryption indicator, wherein the encryption indicator indicates whether not encryption should be applied to PDUs of the first data flow, an in-order delivery indicator, wherein the in-order delivery indicator indicates whether or not in-order delivery is required, an acknowledgement indicator, wherein the acknowledgement indicator indicates whether or not acknowledgements are required, and/or dual connectivity indicator, wherein the dual connectivity indicator indicates whether or not routing for dual connectivity is enabled.

9. The method of claim 8, wherein
the sublayer configuration comprises the encryption indicator, and
the encryption indicator indicates: i) that encryption should be applied only to certain parts of the PDUs that belong to the data flow, ii) that, for each PDU that belong to the data flow, encryption should be applied to the entire PDU, or iii) no encryption should be applied for the data flow.

10. The method of claim 1, wherein
the communication device further comprises a control plane layer,
the second layer determines the sublayer configuration, and
the method further comprises:
the second layer providing to the control plane layer the determined sublayer configuration or an index to the sublayer configuration; and
the control layer providing to a third layer the sublayer configuration or the index to the sublayer configuration.

11. The method of claim 1, wherein
the second layer stores mapping information that maps each feature included in a set of features to a different sublayer configuration,
the information about the PDU identifies one of the features, and
the second layer determines the sublayer configuration to be applied to PDUs associated with the first data flow by determining the sublayer configuration to which the identified feature is mapped.

12. The method of claim 1, wherein
the communication device further comprises a control plane layer,
the second layer provides to the control plane layer the information about the first PDU, and
the method further comprises:
the control plane layer determining the sublayer configuration based on the information about the first PDU; and
the control layer providing to the third layer the sublayer configuration or the index to the sublayer configuration.

13. The method of claim 12, wherein
the control plane layer stores mapping information that maps each feature included in a set of features to a different sublayer configuration,
the information about the PDU identifies one of the features, and
the control plane layer determines the sublayer configuration to be applied to PDUs associated with the first data flow by determining the sublayer configuration to which the identified feature is mapped.

14. The method of claim 11, wherein the one of the features is a QUIC connection feature and the sublayer configuration to which the QUIC connection feature is mapped comprises an encryption indicator indicating that the third layer should not apply encryption to an entire PDU of the first data flow.

15. The method of claim 1, wherein
the first PDU comprises a header and payload, and
the information about the first PDU comprises at least a first protocol identifier identifying a protocol associated with at least a portion of the payload of the first PDU.

16. The method of claim 15, wherein obtaining the information about the first PDU comprises determining the protocol based on a protocol identifier included in a protocol field included in the first PDU.

17. A non-transitory computer-readable medium having stored thereon computer-executable instructions that, when executed by processing circuitry of a communication device, causes the communication device to execute operations, the operations comprising:
controlling a first layer of the communication device to generate a first protocol data unit (PDU) associated with a first data flow;
controlling a second layer of the communication device to obtain the first PDU;
after obtaining the first PDU, controlling the second layer to obtain information about the first PDU;
after obtaining the information about the first PDU, controlling the second layer to either i) determine, based on the information about the first PDU, a sublayer configuration to be applied to at least one or more PDUs associated with the first data flow or ii) provide to another layer the information about the first PDU so that the another layer can determine, based on the information about the first PDU provided by the second layer, the sublayer configuration to be applied to the one or more PDUs associated with the first data flow; and
the second layer generating a second PDU, wherein the second PDU comprises at least a portion of the first PDU.

18. A communication device comprising a protocol stack comprising a plurality of layers, the plurality of layers comprising a first layer and a second layer, wherein:
the first layer is configured to generate a first protocol data unit (PDU) associated with a first data flow; and
the second layer is configured to:
obtain the first PDU;
after obtaining the first PDU, obtain information about the first PDU;
after obtaining the information about the first PDU, either
i) determine, based on the information about the first PDU, a sublayer configuration to be applied to at least one or more PDUs associated with the first data flow, or
ii) provide to another layer the information about the first PDU so that the another layer can determine, based on the information about the first PDU provided by the second layer, the sublayer configuration to be applied to the one or more PDUs associated with the first data flow; and
the second layer generating a second PDU, wherein the second PDU comprises at least a portion of the first PDU.

* * * * *